United States Patent [19]

Gugenberger

[11] 4,404,117
[45] Sep. 13, 1983

[54] CORROSION PROTECTION FOR NON-AMALGAMATED ZINC

[75] Inventor: Thorolf Gugenberger, Kelkheim, Fed. Rep. of Germany

[73] Assignee: Varta Batterie Aktiengesellschaft, Hanover, Fed. Rep. of Germany

[21] Appl. No.: 388,089

[22] Filed: Jun. 14, 1982

[30] Foreign Application Priority Data

Jul. 22, 1981 [DE] Fed. Rep. of Germany ....... 3128900

[51] Int. Cl.$^3$ ...................... H01M 4/26; H01M 4/38; H01M 4/42; H01M 4/54
[52] U.S. Cl. ............................... 252/182.1; 429/219; 429/229
[58] Field of Search .................... 252/182.1; 429/219, 429/229

[56] References Cited

U.S. PATENT DOCUMENTS

| | | | |
|---|---|---|---|
| 3,926,672 | 12/1975 | Curelop et al. | 252/182.1 |
| 4,125,689 | 11/1978 | Jumel | 252/181.1 |
| 4,167,609 | 9/1979 | Scarr | 429/229 |
| 4,307,164 | 12/1981 | Church et al. | 429/229 |
| 4,358,390 | 11/1982 | Coulombeau | 252/182.1 |

Primary Examiner—Irwin Gluck
Attorney, Agent, or Firm—Weiser & Stapler

[57] ABSTRACT

A pseudo-passive anode zinc is obtained by doping ultra-pure Zn powder with 0.1 to 0.6% by weight Ag from a silver thiosulfate solution, and then exposing it at elevated temperature to a zincate-containing hydroxide. This exhibits a lower corrosion rate than ultra-pure zinc by itself. The anodic load capacity of the doped zinc approaches that of active zinc, and the tendency towards reactivation after anodic current loading is significantly reduced.

11 Claims, 1 Drawing Figure

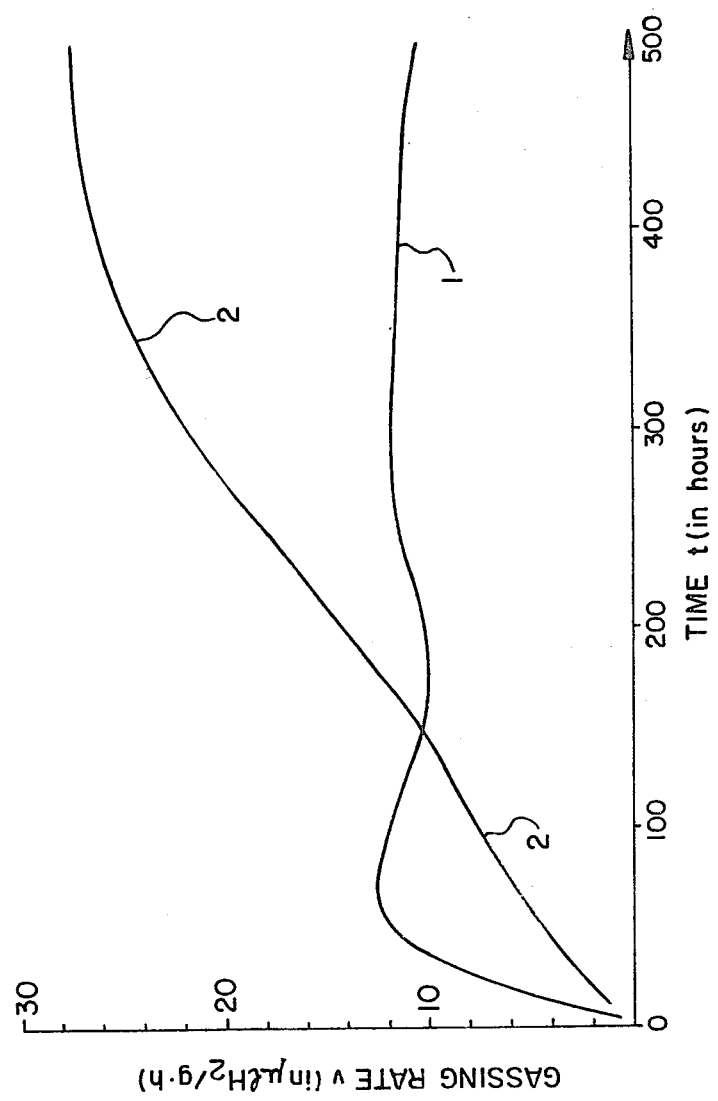

CORROSION PROTECTION FOR NON-AMALGAMATED ZINC

The invention relates to a method for reducing the corrosion of non-amalgamated zinc as electrode material for galvanic primary elements with alkaline electrolytes.

The increased requirements of environmental protection have in many instances led to a turning away from mercury-containing zinc for battery technology. At the same time, however, they have posed anew the problem of zinc corrosion and reduction. In an alkaline medium, the zinc corrosion takes place in accordance with the following partial reactions:

$$\text{Anodic } Zn + 4OH^- = Zn(OH)_4^{2-} + 2e \tag{1}$$

$$\text{Cathodic } 2H_2O + 2e = 2OH^- + H_2 \tag{2}$$

Reaction (2) is mainly kinetically limited, so that the zinc dissolution according to reaction (1) also takes place correspondingly slowly. Reaction (2) slows down with increasing hydrogen over-potential, of the zinc surface.

Less pure commercial zinc always has local surface areas with reduced hydrogen over-potential, because of the incorporation of metals, carbon, or metal oxides, even ZnO. On the other hand, the hydrogen over-potential of ultra-pure zinc reaches very high values, even higher than that of mercury, so that the gas evolution falls to a minimum. It has therefore frequently been attempted to use purest zinc in lieu of amalgamated zinc as the anode material.

However, purest zinc behaves very critically because even slight changes of its surface are capable of substantially affecting the hydrogen potential. Even brief anodic loading of an ultra-pure zinc electrode causes its hydrogen over-potential to decrease a great deal. After unloading, it usually requires several hours before the initial electrode state is again reached. It is then characterized by the blocking of the above-mentioned cathodic partial reaction (2), and this also causes the anodic partial reaction (1) to stop.

At temperatures above ambient, and also with mobile electrolytes, there is experienced an increase with time of the corrosion rate. Therefore even purest, initially passive zinc, without having been contaminated with corrosion promoting substances, exhibits a perceptible tendency to reactivate, which ultimately leads to complete dissolution of the zinc.

In addition, the corrosion and reactivation tendency of very pure battery zinc powder are also subject to pronounced variations, and this disproportionately more so than is the case for amalgamated zinc. Thus, different zinc charges of the same powder type not infrequently exhibit significant differences in their initial activities. Corrosion reduction is achieved by high $OH^-$ ion concentration and, within a certain range of concentration, also by increase in the ZnO content of the hydroxide. That is because, in that case, the balance of the overall corrosion reaction $$H_2O + Zn = ZnO + H_2 \tag{3}$$

is displaced toward the left. From our own experience, the corrosion reduction influence of Zn in the electrolyte can be clearly demonstrated only to a content of about 3% by weight.

Accordingly, it is an object of the invention to provide a technique for maintaining the passivity of purest zinc with respect to activating influences, so that it can be treated aa a suitable substitute for amalgamated zinc in alkaline primary cells.

This and other objects which will appear are achieved in accordance with the invention by doping the zinc powder with silver.

The silver doping can be carried out by means of aqueous solutions of easily soluble silver salts, with which the zinc powder is agitated. In addition to common silver salts, readily soluble complex silver salts can also be used, but preferably silver thiosulfate in whose alkaline aqueous solution the silver is bound in variously composed complexes (thiosulfato-argentate) of especially high water solubility.

By this treatement, the zinc is placed into a pseudo-passive state, on the other hand, and the anodic load capacity is only slightly reduced in comparison with that of active zinc. A very effective stabilization is achieved by doping the zinc with 0.1 to 0.6% by weight of silver and preferably 0.2 to 0.3% by weight. To that end, it is preferred to proceed as follows:

100 parts by weight of Zn powder are added with agitation to an aqueous solution of 50 parts by weight of $Na_2S_3O_3$ and 0.23 parts by weight AgO in 100 parts by weight $H_2O$ which has been cooled to 8° to 10° C. The agitation continues for about three minutes. In so doing, the silver deposits quantitatively on the zinc. After washing, the zinc powder is treated with a hydroxide composed of about 30 percent by weight KOH, 3 percent by weight ZnO, and the remainder up to 100 percent by weight being water. The hydroxide temperature is 50° to 70° C. and preferably 60° C., and the dwell period in the hydroxide is between 100 and 70 hours depending upon temperature and preferably 90 hours. The zinc thus prepared can be kneaded into a paste suitable for dosing, desirably without having to be previously washed or dried, an electrolyte thickener, and then processed into batteries.

The addition of AgO to the thiosulfate solution embodying the invention is desirable because the oxide easily dissolves in a complex manner with $Na_2S_2O_3$, and other anions, which would be undesirable, remain excluded. The Ag complex rapidly reduces in contact with the zinc and the Ag which is produced distributes itself with high uniformity on the zinc.

If the corrosion of the silver zinc is investigated in an electrolyte containing zinc, such as is conventional for alkaline primary cells, the following sequence is observed:

Immediately after doping the corrosion rate initially increases strongly; it passes through a maximum and then falls to a minimum value which is close to the corrosion rate of silver-free zinc. From then on, the reactivation remains significantly below that of silver-free zinc. This has the resuoult that, after a predetermined period, the corrosion rate of the silvered zinc becomes lower than that of Ag-free zinc.

For further details, reference is made to the discussion which follows, in light of the accompanying drawing wherein the single FIGURE shows the gassing rate v ($\mu l H_2/g \cdot h$) as a measure of the corrosion rate of zinc samples, including one which has been doped with Ag in accordance with the invention, as a function of time (t).

Specifically, curve 2 shows the reactivation evolution of a sample of conventional zinc used for primary elements, curve 1 shows that of a sample of the same zinc with an additive of 0.14% by weight Ag. The measurements always took place in an electrolyte of 35% by weight KOH, 3% by weight ZnO at 60° C.

This shows that the corrosion rate of the unsilvered zinc sample 2 increases reasonably uniformly over 500 hours, whereas for the Ag-doped sample 1 a gassing maximum is traversed after about 70 hours, which is followed by more or less constant gas evolution at a lower level. This corresponds approximately to the corrosion rate of silver-free zinc. Moreover, from the time of maximum gassing onward, the reactivation tendency is even significantly below that of silver-free zinc. The result of this is that, after a certain period, the corrosion rate of the silver zinc becomes lower than that of Ag-free zinc. By the hydroxide treatement of the Ag-doped zinc powder at elevated temperature according to the invention, the pseudo-passive state of the electrode zinc is produced even before incorporation into the battery and without utilizing the actual battery electrolyte.

The effect produced by the technique embodying the invention is surprising because prior experience has led to the belief that contamination of a non-noble metal with other, particularly more noble metals, leads to an increase in corrosion. For example, pointing in that direction is German Offenlegungsschrift (Patent Publication) DE-OS No. 2 009 931, which corresponds to U.S. Pat. No. 3,623,911, and according to which a zinc electrode dissolves at a higher rate when it contains small quantities of an additive metal from Group III or IV B of the periodic system, such as gallium or tin.

In the case of the invention, there is indeed also produced a high corrosion current, as shown by the disproportionately high gassing rate during the initial, approximately 50 hours of hydroxide treatment. However, the uniform covering of the zinc owder particles with the silver precipitated out of the thiosulfate solution appears to be the reason why the zinc particles are rapidly and also uniformly enveloped by $Zn(OH)_2$ or $ZnO$, so that all of the initially present non-homogeneities which lead to local corrosion currents are smoothed out all around the particle. Consequently, the zinc is placed into a state of continued pseudopassivity by means of an accelerated and encompassing corrosion process and is stabilized, in that sense.

The zinc which is used in accordance with the present invention, whether called ultra-pure, purest, or otherwise, is that which shows no detectable traces of the metals. This type of zinc is conventionally used in primary batteries, and is commercially available, for example, as Overpelt 015, or New Jersey 1230.

I claim:

1. A negative, non-amalgamated zinc powder electrode for galvanic elements with alkaline electrolyte, characterized in that the zinc powder is doped with silver.

2. The electrode of claim 1 wherein the silver doping is in the range of about 0.1 to 0.6% by weight.

3. The electrode of claim 2 wherein the doping is with 0.2 to 0.3% by weight.

4. The electrode of claim 1 wherein the zinc powder itself is ultra-pure.

5. The method of producing a non-amalgamated zinc powder electrode according to claim 1 wherein
   the zinc powder is treated with an aqueous solution of an easily soluble silver salt,
   the zinc powder is subsequently exposed to a zincate-containing warm hydroxide, and
   is subsequently formed into an electrode in conventional manner.

6. The method of claim 5 wherein the easily soluble silver salt is silver thiosulfate.

7. The method of claim 6 wherein the silver thiosulfate solution is composed of approximately 100 parts by weight $H_2O$, 50 parts by weight $Na_2S_2O_3.5H_2O$ and 0.23 parts by weight AgO.

8. The method of claim 5 wherein the zincate-containing hydroxide is composed of about 30% by weight KOH, 3% by weight ZnO and the remainder up to 100% by weight $H_2O$.

9. The method of claim 5 wherein the temperature of the zincate-containing hydroxide is in the range of 50° to 70° C. and the dwell time of the zinc powder in the hydroxide is in the range of 100 to 70 hours.

10. The method of claim 9 wherein the temperature is approximately 60° C. and the dwell time is approximately 90 hours.

11. The electrode produced by the method of claim 5.

* * * * *